May 16, 1961  J. E. SMITH  2,984,573
METHOD OF PACKAGING PERISHABLE FOODS
Filed Nov. 24, 1958
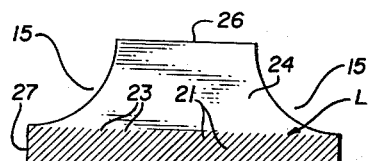
Fig. 1
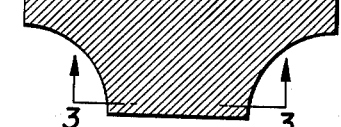
Fig. 2
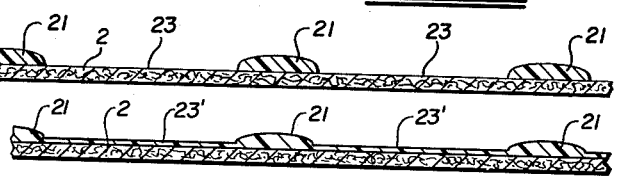
Fig. 3
Fig. 4
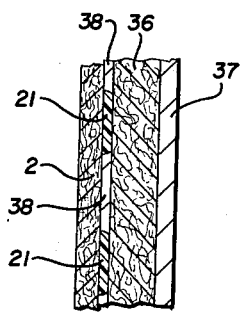
Fig. 7
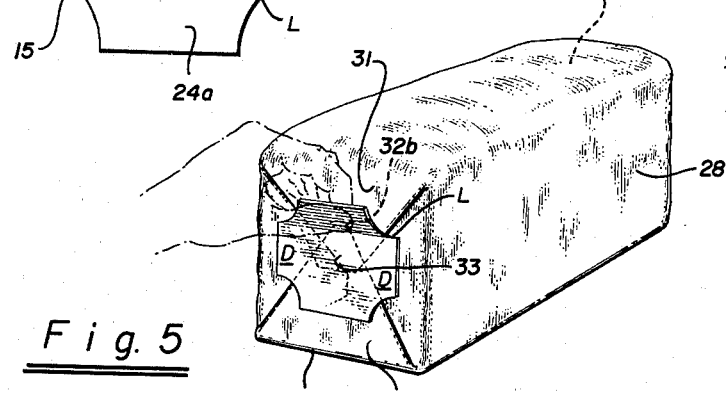
Fig. 5
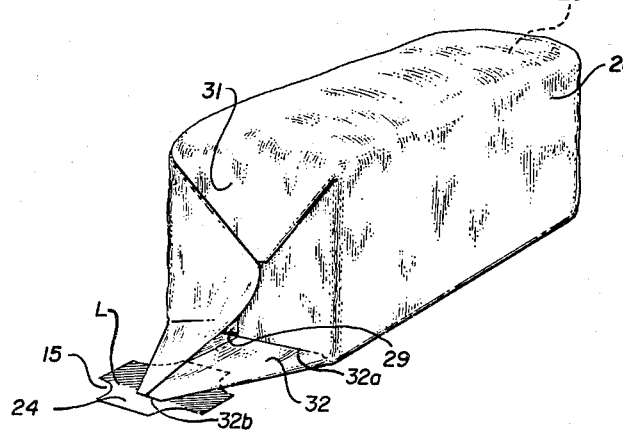
Fig. 6
INVENTOR.
James E. Smith
BY *Hyer & Johnson*
Attorneys United States Patent Office 2,984,573
Patented May 16, 1961

2,984,573
METHOD OF PACKAGING PERISHABLE FOODS
James E. Smith, Hayward, Calif., assignor to Crown Zellerbach Corporation, San Francisco, Calif., a corporation of Nevada
Filed Nov. 24, 1958, Ser. No. 775,859
3 Claims. (Cl. 99—172)

This invention relates to the packaging of articles, such as bread, with a flexible sheet wrapper provided with folds over an end of the article, and more particularly to the sealing of such folds by a label having a heat sealable thermoplastic coating thereon adapting the label to be sealed by heat and pressure. In an advantageous embodiment, the principal substance of the coating is polyethylene which enables the label or sealing sheet to be heat sealed to polyethylene film, as well as to other materials, such as waxed paper, wax coated glassine, cellophane (regenerated cellulose), and metal foil, such as aluminum. Such composition, sheet material coated therewith and laminated products are described and claimed in assignee's copending application, Serial No. 772,523, filed Nov. 7, 1958, by James E. Smith, the applicant hereof, and Christopher C. Mazura; the method of application are disclosed and claimed in assignee's copending application, by the same inventors, Serial No. 772,573, filed Nov. 7, 1958; and the heat sealable label, label roll and method of manufacture are disclosed and claimed in assignee's copending application, Serial No. 775,782, filed Nov. 24, 1958, by the applicant hereof.

The coating is particularly applicable to flexible porous base sheets of a cellulosic character, such as paper, to be applied as sealing labels, over the folds of wrappers about articles, such as bread wrappers. United States Patents Nos. 2,228,785, dated January 14, 1941, and 2,348,687 and 2,348,688, both dated May 9, 1944, disclose compositions of this character which contain essentially wax as the principal ingredient. To decrease striking through or in other words penetration of the wax into the porous or pervious base sheet, a film forming agent is incorporated, such as rubber. This film forming agent renders the wax more cohesive and gel-like in character. Although these types of compositions have been employed for laminating the base sheet to waxed paper and cellophane wrappers, they offer only marginal adhesion to polyolefin, particularly polyethylene film which with the advent of this invention is now being employed as wrappers for articles, such as bread.

Furthermore, these essentially wax coating compositions present problems in their application to the base sheet by means of knurled rolls of the rotogravure type because of their stringy character when applied by hot melt application at their usual hot melt coating temperature of about 250° F.

The instant invention has as its objects, among others, the provision of an improved package of the character described and method of forming the same, in which a flexible base sheet of material is desirably coated with an improved heat sealable coating composition for overcoming the foregoing problems; the composition being of such character as to enable the coating to be applied over a limited area of the label sheet so as to form a pull tab portion on the label; the composition of the coating also being such that when applied to the base sheet, the resultant coated sheet can be heat sealed to polyethylene, as well as to other materials, such as waxed paper, metal foil or cellophane. Furthermore, the characteristics of the coating enable it to be applied to the base sheet by hot melt application and by means of a knurled applicator roll of the rotogravure type to form the coating as discrete projections which provide many advantages pointed out hereinafter.

Referring to the drawings:
Fig. 1 is a plan view of the coated face of a form of label illustrating the coating applied thereto in a pattern arrangement providing a pull tab band;
Fig. 2 is a view similar to Fig. 1 illustrating the coating applied in a pattern providing two pull tab bands;
Fig. 3 is an enlarged fragmentary sectional view illustrating the coating on the sealing sheet in the form of tooth-like anchoring projections; the plane of the section being indicated by line 3—3 in Fig. 1;
Fig. 4 is a view similar to Fig. 3 illustrating such anchoring projections as part of a continuous coating on the base sheet;
Fig. 5 is an isometric view illustrating an article, such as bread, wrapped and end sealed by a label having the heat sealable coating of this invention;
Fig. 6 is a view similar to Fig. 4 but illustrating the end of the wrapper partially opened;
Fig. 7 is an enlarged fragmentary sectional view illustrating the manner in which the tooth-like anchoring projections on the base sheet penetrate a wax coating on a wax coated sheet to enable direct lamination to such sheet.

The heat sealable adhesive coating on the sealing sheet of this invention desirably embodies polyethylene as its principal or essential bonding agent, and has a fast set-up time, so that it will congeal quickly to a firm-solid flexible mass rendering it capable of application to a sheet in the form of discrete teeth or projections which will not materially coalesce or run together. The polyethylene is modified with any suitable additive compatible with polyethylene and which is capable of reducing the viscosity and melting point of the resultant composition compared to the polyethylene alone, and also to increase tackiness of the composition in the region of its melting point but at the same time not materially decrease the set-up time of the composition, namely, the time that it takes for the product to congeal to a relatively non-flowable substantially firm solid mass that will not run, thus enabling application to a base sheet by a knurled roll for producing discrete projections on the surface of the base sheet.

The composition of the advantageous embodiment should contain at least 50% by weight polyethylene of the desirable type described later, as this is the essential ingredient which provides for the quick set-up time and insures secure adhesion to polyolefin film such as polyethylene, and also provides desirable viscosity characteristics for hot melt application. As much as 95% by weight of this polyethylene may be employed in the composition.

The properties of the polyethylene should be such that it quickly congeals to a self-sustaining film when coated from molten state onto a base sheet, so that it will not materially penetrate or strike through a base sheet, such as paper, which is of a porous or permeable character. Also, the polyethylene should remain tacky over a relatively wide temperature range of about plus or minus 25° F. at its melting point so that it will impart good adhesion when heated to about its melting point, and which is of sufficiently low viscosity when melted so that it can be handled and applied by conventional hot melt coating equipment. Polyethylenes most suitable for the purpose are those of relatively low molecular weight in the range of about 4,000 to 6,500 (Staudinger method) which are formed by catalytic polymerization of ethylene under high pressure because such polyethylenes possess superior self-sustaining film form-properties with good adhesive characteristics and yet can be applied by hot melt application.

Polyethylenes above this desirable molecular weight range and up to about 14,000 molecular weight may be used but are not as suitable because they require extensive modification by incorporation of additives to impart the desired properties to the composition. Polyethylenes below the desirable range are generally of the type that are formed by thermal degradation of higher molecular weight ethylene polymers. Although more brittle and lower in adhesive bond, they may be modified by additives to promote flexibility and adhesion. The following table sets forth ranges in important properties of the desirable type of polyethylene:

TABLE I

*(Properties of polyethylene—Range)*

| | |
|---|---|
| Melting point | 200° F. to 220° F. |
| Molecular weight | 1,500 to 14,000 |
| Viscosity at 300° F. (cps.) | 600 to 7,000 |
| Density | 0.905 to 0.930 |

In the foregoing table, and in all other subsequent tables and examples unless otherwise specified, the melting point (M.P.) is determined by the minimum rate of temperature change method (A.S.T.M., D-87-42), the molecular weight (M.W.) by the Staudinger method, the viscosity (V) in centipoises (cps.) at 300° F. by the Brookfield synchro-lectric viscosimeter at a spindle speed of one (1) revolution per minute, and the density (D) by any customary method for determining specific gravity. Typical polyethylenes that have been found most suitable and their properties, are about:

TABLE II

*(Properties of typical polyethylenes)*

| | M.P., °F. | M.W. | D. | V., cps. |
|---|---|---|---|---|
| Epolene C | 208 | 4,500-5,000 | 0.907 | 2,000 |
| Bakelite DYLT | 215 | 12,000 | 0.910 | 5,000 |
| Tenite 812 | 215 | 10,000 | 0.910 | 4,000 |

Epolene C and Tenite 812 are manufactured by Eastman Chemical Products, Inc., of Kingsport, Tennessee, and Bakelite DYLT by Bakelite Corp. of New York, New York. Epolene C has been found to give best results because of superior adhesive and desirable viscosity characteristics, and is consequently preferred.

Various additives or combinations thereof, desirably non-waxes, compatible with polyethylene are blended therewith to provide a suitable resultant composition that can be applied by the so-called hot melt method wherein the composition is maintained in molten state in a coating pan, and applied to the base sheet by applicator roll. Additives that will reduce the viscosity and melting point, and increase the tackiness of the resultant composition compared to the polyethylene alone, are employed. Examples of these types of additives that impart all three of such properties are polyterpenes, rosins, rosin derivatives, polyamides and methylated hydrocarbon resins. In some instances, if increase in tackiness is more than desired, anti-blocking agents, such as hydrogenated fats and oils and fatty acid amides may be incorporated in the blend. The latter additives also have the property of reducing melting point and viscosity. Certain types of additives, such as alpha-methyl styrene polymers and polybutenes are good tackifiers and may be incorporated in the blend if desired.

Although paraffin, microcrystalline and synthetic waxes will blend with polyethylene and reduce the viscosity and melting point of the blend compared to polyethylene alone, they are not desirable because they cause serious reduction in the heat seal bond strength to polyethylene film and cellophane. As little as 5% by weight wax in the formulation will cause poor seal development to polyethylene film and cellophane. Also, the resistance of waxes to oxidation is poor at the higher temperatures of 265° F. to 350° F. required for hot melt application of the essentially polyethylene blend hereof compared to lower temperatures for essentially wax compositions. This leads to objectionable color and odor development if a substantial amount of wax is in the formulation. Therefore, it is advantageous to omit wax from the formulation, but if it is employed for viscosity and melting point reducing purposes, it should not constitute more than about 2% by weight of the blend.

The amounts and varieties of particular additives compatible with the polyethylene so that they can be homogeneously blended therewith to impart the desired properties to the resultant composition, may be varied considerably as will be apparent to those skilled in the art. However, as previously mentioned, the blend should contain at least 50% by weight of the polyethylene to impart bonding strength to the composition, provide a non-penetrating coating on porous base material, provide quick set-up time, and to provide for satisfactory heat seal bonding to polyethylene film or other polyethylene surfaces.

Particular additives most suitable and which have been found to produce best results are Hydrofol Glyceride T57N by Archer Daniels Midland Company, Minneapolis, Minnesota; Oronite Polybutene No. 24, by Oronite Chemical Company, San Francisco, California; Staybellite Ester No. 10 by Hercules Powder Company, Wilmington, Delaware; Piccopale No. 85, by Pennsylvania Industrial Chemical Company of Clairton, Pennsylvania; Versamid 100 by General Mills, Inc., of Minneapolis, Minnesota; Piccolyte S-115L by Pennsylvania Industrial Chemical Company; and Piccolyte S-10 also by Pennsylvania Industrial Chemical Company.

Hydrofol Glyceride T57N is composed of triglyceryl esters of fatty acids of which stearic acid is the major component. It is produced by the hydrogenation of best quality animal fat. It has a melting point in the range of 141-149° F., a maximum acid number of 0.5, a saponification number of 193-196, a maximum iodine number of 1 and a specific gravity of 0.846. It serves the purposes of an anti-blocking agent, and of reducing the viscosity and melting point of the blend compared with the polyethylene alone.

Oronite Polybutene No. 24 serves primarily as a tackifier. It is composed of polymers of polybutenes obtained by the catalytic polymerization of normal and branched chain butenes. It has a molecular weight range of 800 to 1500 and is a liquid at normal temperatures. It should be employed in relatively small amounts, not over 5.0% by weight of the blend, as it may present blocking problems if in too great a quantity.

Staybellite Ester No. 10 is a pale hard synthetic resin consisting of glycerol esters of hydrogenated rosin. It has an acid number of 10, a melting point of 176° to 190° F. and a specific gravity of about 1.07 at 25° C. It serves as a tackifier, and viscosity and melting point reducing agent.

Piccopale No. 85 is essentially a hard hydrocarbon resin, which serves as a viscosity and melting point reducing agent, and as a tackifier. It is produced by the polymerization of unsaturates derived from the deep cracking of petroleum, and may be classed as a methylated paraffin having an average molecular weight of approximately 1100 and a melting point of 200° F.

Versamid 100 is a polyamide resin produced by condensation of dimerized and trimerized unsaturated fatty acids of vegetable oils with ethylene diamine. It is a viscosity and melting point reducing agent, as well as a tackifier. It is liquid at normal temperatures.

Piccolyte S-10 and S-115L also serve all three purposes. They are polyterpene resins derived from hydrocarbon residues of petroleum refining operation. Piccolyte S-115L has a melting point of 239° F.±6° F., a molecular weight of 1,200, a density at 60° F. of 0.980, a refractive index at 68° F. of 1.535 and acid and saponification numbers substantially zero. With respect to Piccolyte S-10, it is similar in properties but has a much lesser melting point of about 50° F.±6° F. Because of its relatively low melting point, it is a marked tackifier; and if employed in the composition, it should be in relatively small amounts, and desirably be used in conjunction with an additive having good anti-blocking properties.

Rosin may also be employed as an additive with good effects for the purpose of imparting tack, and lowering viscosity and melting point. However, it tends to discolor at the hot melt application temperature range of 265° F. to 350° F., and consequently is not desirable if appearance of the final product is important.

As previously mentioned, the additive agents may be employed in widely varying amounts with the essentially polyethylene blend containing at least 50% by weight polyethylene. In this connection, for hot-melt application, the polyethylene compatible additives should be incorporated with the polyethylene to impart the following properties to the resultant blend.

TABLE III (Properties of polyethylene—Additive blend—Range)

Melting point _____° F__ 180 to 205
Viscosity at 300° F. (cps.) _____ 500 to 2500

With these melting point and viscosity ranges, the heat sealable polyethylene coating blend can be applied to the base sheet by hot melt application, while the blend is maintained at the aforementioned desirable temperature of between 265° F. to 350° F. After application to the base sheet, the properties of the blend imparted thereto by the large amount of polyethylene therein, will enable it to set up under atmospheric conditions to a congealed, firm but yet flexible, moisture resistant and substantially non-blocking mass (substantially non-stickable to other stacked sheets or in a roll) in less than one second. At the same time there will be substantially no penetration or striking through of the composition into a porous cellulosic base sheet, such as paper. Also, the blend can be applied by means of a knurled applicator roll without substantial coalescence after such application, to thus form discrete tooth-like anchoring projections on the base sheet which are important for reasons explained later. However, if desired, the blend may be applied as a continuous coating over the base sheet.

The 265° to 350° F hot melt application temperature is desirable. If the temperature is much below 265° F., clean coating application may be impeded because of increase in coating viscosity. Should the coating composition be much above 350° F., it may become degraded by excessive heat. Also, its viscosity may be reduced to the extent that it might penetrate a porous base sheet, such as paper to such degree as to require excess coating application.

The following are examples of particular formulations in percent by weight of the substances. Example 1 has been found to produce best results and is preferred.

|  | Ex. 1 | Ex. 2 | Ex. 3 | Ex. 4 |
|---|---|---|---|---|
| Epolene C (polyethylene) | 80.0 | 80.0 |  |  |
| Tenite 812 (polyethylene) |  |  |  | 60.0 |
| Bakelite DYLT (polyethylene) |  |  | 55.0 |  |
| Piccolyte S-115L (polyterpene—viscosity and melting point reducer, and tackifier) | 20.0 |  | 5.0 | 7.0 |
| Piccolyte S-10 (polyterpene—viscosity and melting point reducer, and tackifier) |  |  | 5.0 | 7.0 |
| Hydrofol Glyceride T57N (hydrogenated animal fat—viscosity and melting point reducer, and antiblocking agent) |  |  | 15.0 | 13.0 |
| Rosin (viscosity and melting point reducer, and tackifier) |  | 20.0 | 25.0 | 20.0 |
|  | 100.0 | 100.0 | 100.0 | 100.0 |

In example 2, the rosin is ordinary wood rosin having substantially the following properties:

Melting point _____° F__ 169
Acid number _____ 166
Saponification number _____ 172
Specific rotation _____ +13
Refractive index _____ 1.5453
Density at 20° C. _____ 1.067

It is to be noted that in Example 2, rosin is substituted in equal amount for the Piccoylte S-115L of Example 1. The resultant polyethylene rosin blend is almost as good as the composition of Example 1, but the composition of Example 1 is more desirable.

The formulations of the foregoing examples have the following approximate melting points and viscosities:

TABLE IV
(Properties of particular polyethylene—additive blends)

|  | M.P., ° F. | Viscosity, c.p.s. |
|---|---|---|
| Example 1 | 194 | 1,200 |
| Example 2 | 189 | 1,000 |
| Example 3 | 185 | 2,000 |
| Example 4 | 189 | 1,600 |

In Example 1, it is to be noted that the melting point of the resultant composition is less than that of the polyethylene and the additive incorporated therein. This is believed due to an eutectic-like effect.

With respect to all examples, the viscosity of the blend is reduced compared to the polyethylene alone, thus facilitating hot-melt knurled roll application. Furthermore, the melting point is reduced which is important when the coating is applied to a base sheet of material adapted to be laminated by heat sealing to polyethylene film. This is so because polyethylene film is relatively fragile and can be easily damaged by too high a heat sealing temperature. The melting point of polyethylene film presently widely employed for wrapping is about 225° F., and can be readily damaged if the heat sealable laminant melts at a temperature too close to 225° F. because within about 20° F. of its melting point, the film becomes soft and is subject to pin hole formations under heat seal pressure. Thus, the reduced melting point of the polyethylene laminating blend, provides a margin of safety and allows such heat sealing without impairment of the film. Desirably, for laminating to polyethylene film, the melting point of the polyethylene laminating blend should be at least 20° F. less than the melting point of the film.

The manner of blending the polyethylene with the compatible additive, is readily effected because of the character of the desirable type of polyethylene, by mixing these substances together in molten state at an elevated temperature, as is disclosed in applicant's aforementioned copending application, Serial No. 775,782. The method of applying the coating to the sheet of label material by knurled roll applicator is disclosed in such copending application by applicant, and in the aforementioned copending application, Serial No. 772,573, by applicant and Christopher C. Mazura.

The individual end labels shown in Figs. 1 and 2 comprise flexible base sheet 2 (Fig. 3) and are formed from a roll (not shown) of a parent label sheet, as is disclosed in applicant's copending application, Serial No. 775,782. In commercial operations for sealing the end folds of bread wrappers illustrated in Fig. 5, the labels are automatically cut from the sheet as it is unwound from the parent label roll, and are automatically applied and heat sealed to the wrapper end folds by well known bread wrapping and end label applying equipment, such as is disclosed in United States patents to Weida, 2,349,317, dated May 23, 1944, and to Pohl, 2,409,065, dated October 8, 1946.

Quite commonly, the labels are formed with notched corners 15 cut in base sheet 2 to which the thermoplastic bonding coating is adhered but they may be rectangular in shape or any other suitable shape. As is well known in the art, base sheet 2 for bread wrapper end labels is desirably of cellulosic sheet material, such as paper. Usually, the labels are of about 35 lbs. per ream of good grade sulphite paper.

The knurled applicator roll is preferably grooved to apply an oblique pattern of the coating on the label. However, it is to be understood that the knurling of the roll may be of any suitable pattern. For example, the knurling may be such as to apply a grid-like criss-cross pattern to the parent label sheet or a dotted pattern. This is not particularly critical. The grooves of the applicator roll are of relatively small dimensions, in the order of several thousandths of an inch. Usually, the uncoated surface of the label base sheet is printed with desired legends, such as trademarks, special designs, or price of the object to which the label is to be attached. Such printing is indicated by the letters D in Fig. 5.

As a result of the aforementioned characteristics of the preferred type of coating by virtue of its relatively large polyethylene content, it has fast set up time and will not materially coalesce but will form on the base sheet tooth-like, discrete solid and flexible anchoring projections 21 which lay on the surface of the base sheet and remain substantially intact thereon without substantial penetration therein. As is explained in the aforementioned copending application of applicant, Serial No. 775,782, a doctor blade is employed in cooperation with the knurled applicator roll. With the doctor blade in intimate wiping contact with the periphery of the knurled roll, these projections are separated by substantially uncoated valleys 23, thus forming a discontinuous coating on the base sheet. However, a thin film 23' of the coating may be applied to the base sheet in the valleys 23 between the anchoring projections 21, by adjusting the doctor blade in suitable spaced relationship with respect to the periphery of the applicator roll.

Employing a knurled roll having grooves of the dimensions indicated in applicant's copending application, Serial No. 775,782, and with the doctor blade in slight frictional contact with the knurled roll, the projections will average about 0.002 inch in height, about 0.012 inch in width at the base, and be spaced apart about 0.035 inch between their centers. Under a magnifying glass, a slight running of a very minor character may be seen from the sides of the bases of anchoring projections 21. However, this running does not fill up valleys 23.

The amount of coating to be applied to the base sheet may vary widely depending upon the type of material to which labels subsequently formed therefrom are to be laminated by heat sealing. With discontinuous knurled roll application, the range will usually be from 3 to 12 lbs. per ream (3000 square ft.) of base sheet. For application to commercial polyethylene film, 4 to 5 lbs. of the coating per 3000 square ft. has been found to be best. For wax coated paper, 7 to 12 lbs. is preferable, and desirably 8 lbs. per 3000 square ft. For adherence to cellophane, a suitable range is 5 to 9 lbs. per 3000 square ft. and desirably 6 lbs. The reason for the lower amount when the base sheet is to be laminated to polyethylene film is that the less material to be thermoplastically fused to such film by heating sealing under pressure, the less chance there is of damaging the film which is very thin.

Referring to Fig. 1, it will be noted that in one embodiment of application of the coating, the base sheet is free of coating along a relatively wide transversely extending strip or area 24 adjacent an edge 26 and between opposite edges 27 of the label. This provides an unsecured band forming a free pull tab for facilitating removal of the label after it has been heat sealed to an object. In the Fig. 2 embodiment, another free band 24a is similarly provided. With two pull tabs, one above the other, the label can be pulled from an object in either one of opposite directions.

In this connection, it will be noted from Figs. 5 and 6 that the wrapper 28 about bread loaf 29 is conventionally wrapped with its upper fold 31 underlying the outermost lower fold 32 which has a hinge connection crease 32a at its lower end, and that the central region 33 of the label is heat sealed over the folds. The one pull tab modification of Fig. 1 provides a greater sealing area to the wrapper, and is hence preferred. The label is desirably adhered to the wrapper end folds with the junction line L between the pull tab 24 or 24a and the coated area below the top end 32b of the outermost fold 32 so that end 32b of the outermost fold extends beyond the coated portion of label and overlies the pull tab. This enables ready pulling of outer fold 32 downwardly on its hinge connection upon downward pull of the pull tab, to thus facilitate opening of the wrapper, as is illustrated in Fig. 6.

In addition to serving as a pull tab, the uncoated area 24 or 24a provides another important advantage. These transversely extending uncoated areas enable the label sheet to be cut through such areas from the parent sheet of the label roll as the sheet is unwound from the roll, by cutting means on the bread wrapping equipment to preclude build-up of the coating thereon, thus precluding fouling of the cutting means. Such fouling which occurs because of frequent passage of a cutting knife through coated areas of the thermoplastic adhesive, otherwise necessitates stopping of the machine for cleaning of the same. The customary size of a bread label, disregarding the notched corners, is about 2¾ inches square. A suitable pull tab length is about ⅝ inch.

As previously mentioned, the melting point of the desirable flexible, heat sealable adhesive composition bonded to the label is less than the melting point of conventional commercial polyethylene film now on the market, such polyethylene film usually having a minimum melting point of about 225° F. This is important, for example, when the coated label is employed to seal the end folds of a polyethylene wrapper film employed for wrapping an object, such as bread. This is so because in the machine wrapping of such bread in a widely used type of conventional bread wrapping apparatus wherein the end label is heat sealed over the end folds of the wrappers, the label is not heated before it is applied to the end folds. Normally the end folds are first preheated to a temperature below the melting point of the polyethylene laminating coating on the base sheet.

As a result, when the peaks of coating anchoring teeth 21 are applied to the polyethylene film, they will become sufficiently tacky because of the heat transferred thereto from the film, to adhere to such film without substantial slipping. Subsequently, when pressure and heating means embodied in the machine are applied to the end label initially adhered to the folds, with heat applied to the label to soften the coating at about its melting point and desirably at least 20° F. less than the melting point of the polyethylene film, the label will adhere firmly to the polyethylene wrapper without damaging or in other words impairing the wrapper. Such adherence is enhanced by the teeth 21 which present minimum surface contact with the polyethylene film thus effecting ready fusion with the film.

The tooth adherence is also true for anchoring to the various lacquer films, such as nitrocellulose and polyvinylidene chloride (Saran) films, conventionally employed on cellophane. Furthermore, with reference to polyethylene film, metal foil and lacquer coated cellophane, even though the end folds of the wrapper may not be initially preheated, the peaks of the teeth have sufficient frictional tack at room temperature to cling to these materials (polyethylene film, metal foil and cellophane) upon application of the normal wrapping machine pressure which applies the end label to the end folds. Upon subsequent application of heat and pressure, the labels become heat sealed to the folds.

An additional important advantage of the anchoring teeth projections 21 is that they also enhance firm heat sealing directly to base sheets that are wax coated, for example, conventional wax coated paper bread wrappers, even though essentially polyethylene heat sealing compositions do not adhere as well to the wax of wax coated sheets as they do to polyethylene, lacquer coated cellophane, metal foil such as aluminum, and paper fiber. This is because under heat and pressure the teeth can readily bite through or penetrate a thin wax coating on the base sheet, so as to adhere directly to the base itself. Such effect is illustrated in Fig. 7 which illustrates a conventional paper bread wrapper 36 usually of about 25 lb. per ream sulfite paper and having essentially wax coated surfaces 37 and 38.

When base sheet 2 with anchoring teeth 21 is heat sealed over wax coating 38, by heat and pressure, for example, by the usual means embodied in the aforementioned conventional bread wrapping equipment, the teeth will penetrate the molten wax and the peaks thereof will come into direct contact with the underlying paper 36 to which it will adhere with a tenacious bond. Even if the heat sealable composition is applied as a smooth continuous coating to the base sheet 2, adherence to porous wax coated base sheets can be effected by imparting sufficient pressure and heat to the wax to drive wax into the sheet upon which it is coated.

With respect to heat sealing to lacquer coated cellophane and other material, such as metal foil, there is no particular problem except that the polyethylene additive incorporated in the desirable type of composition, should impart sufficient tackiness to the laminating coating at the melting point of the coating composition. From the preceding, it is seen that the laminating coating composition on the label provides the important advantage of being heat sealable to polyethylene as well as other materials.

In this respect, the preferred coating composition on the label is very tacky and viscous in the region of its melting point because of its high polyethylene content and the tackifier therein. It remains in this tacky and viscous condition at the high temperatures of the sealing plates in conventional bread wrapping equipment. Therefore, the coating has high frictional drag and shear resistance. This is so even if the composition is applied as a smooth coating on the label. Because of such properties, lateral slippage of the label with reference to the end folds of non-wax coated bread wrapper such as cellophane, metal foil or polyethylene, is minimized thereby insuring accurate positioning or centering of the end label over the end folds by the wrapping machine which applies the labels to the end folds by movement thereof in a direction transverse to the plane of the end folds and while the bread is moving. The wax of wax coated wrappers, which is in heated molten state when the label is applied by the wrapping machine, creates slip but with the anchoring teeth or projections of this invention, such slippage is minimized with wax coated wrappers. During the heat sealing, the projecting anchoring teeth 21 do not coalesce under the heat and pressure, although there is some lateral flow.

The invention has found wide application for the coating of end label sheets, to be sealed to the folded ends of bread wrappers which have heretofore been of cellophane or waxed paper. However, by virtue of the preferred type of coating composition, application to polyethylene film wrappers can be employed.

Because of the characteristics of the preferred heat sealable coating, and the physical arrangement of the coating on the label, the completed package is firmly sealed irrespective of the material of the wrapper, and also properly centered over the end folds of the wrapper, to thus insure that a perishable object, such as bread, remains in good condition. The highly moisture resistant property of the essentially polyethylene heat sealable coating is important because when heat sealed to the wrapper, a highly moisture resistant bond is effected between the coating and the wrapper. As a result when wrapped objects, such as bread, are placed under refrigeration for preservation as is done in many households, the sealing label will not become loose as a result of moisture deterioration. This is also so when the wrapped product is packaged in or distributed to regions of high relative humidity.

Although labels of the type described are usually provided with printed matter including insignia or designs, it is to be understood that the term "label" as employed herein includes such article irrespective of whether it does or does not have such printed matter thereon.

I claim:

1. In the method of packaging loaves of bread wrapped with a flexible sheet wrapper extending about the respective loaves and provided with overlapping folds over an end portion of each loaf, and wherein such folds are sealed by a sealing sheet having a thermoplastic heat sealable coating thereon, the sealing sheet is applied to the folds while the loaf is moving by moving the sheet onto the folds in a direction transverse to the plane of the folds, and heat and pressure is applied to the sealing sheet to effect bonding of the sealing sheet to the folds; the step of applying over said folds a sealing sheet carrying a coating composition consisting essentially of a homogeneous blend of at least 50% by weight polyethylene and the remainder additive material imparting to the coating decrease in melting point and viscosity, and increase in tackiness at about its melting point compared to the polyethylene alone, said coating being in the form of discrete projections to minimize lateral slippage of the sheet when the sheet is applied to the folds, said coating projections being over opposite side portions of the sheet as well as intermediate portions of the sheet between said opposite side portions; said polyethylene having a melting point of about 200° to 220° F., a molecular weight of about 1,500 to 14,000, a density of about 0.905 to 0.930, and a viscosity of about 600 to 7,000 cps. at 300° F.; and said additive remainder being a resin of the group consisting of glyceryl esters of fatty acids, polymers of polybutenes, glycerol esters of hydrogenated rosin, hydrocarbon resin, polyamide resin, polyterpene resin, and rosin.

2. The method of effecting centering and firm sealing of sealing sheets on overlapping end folds of flexible sheet wrappers about bread loaves while the wrapped loaf is moving and the sealing sheet is applied to the folds by moving the sheet against the folds in a direction transverse to the plane of the folds, and heat and pressure is applied to the sealing sheet to effect bonding of a thermoplastic heat sealable coating on the sheet to the folds; comprising minimizing lateral slippage of the sheet relative to the folds as the sheet is applied to the folds during such movement of the loaf by applying to said folds a sealing sheet carrying a coating composition consisting essentially of a homogeneous blend of at least 50% by weight polyethylene and the remainder additive material imparting to the coating decrease in melting point and viscosity, and increase in tackiness at about its melting point compared to the polyethylene alone, said coating being in the form of discrete projections over opposite sides as well as intermediate portions of the sheet; said polyethylene having a melting point of about 200° to 220° F., a molecular weight of about 1,500 to 14,000, a density of about 0.905 to 0.930, and a viscosity of about 600 to 7,000 cps. at 300° F.; and said additive remainder being a resin of the group consisting of glyceryl esters of fatty acids, polymers of polybutenes, glycerol esters of hydrogenated rosin, hydrocarbon resin, polyamide resin, polyterpene resin, and rosin.

3. The method of packaging perishable food articles wrapped in a flexible wrapper of sheet material which is provided with overlapping folds over a terminal portion of the article while the article is moving, and with a sealing sheet applied over said overlapping folds by moving said sealing sheet against said folds in a direction transverse to the plane of said folds, said method comprising applying over said overlapping folds a sealing sheet carrying a thermoplastic heat sealable coating in the form of discrete projections providing small irregularities in the order of several thousandths of an inch in height, said coating extending over areas of the sealing sheet which will be disposed along marginal edges of said overlapping folds when said sealing sheet is positioned over said overlapping folds for heat sealing the same thereto by heat and pressure, and applying heat and pressure to the thus coated sealing sheet to effect bonding of said coating to said folds.

References Cited in the file of this patent

UNITED STATES PATENTS

| | | |
|---|---|---|
| 2,099,301 | Hamersley et al. | Nov. 16, 1937 |
| 2,228,785 | Smith et al. | Jan. 14, 1941 |
| 2,348,687 | Abrams et al. | May 9, 1944 |
| 2,348,688 | Abrams et al. | May 9, 1944 |
| 2,453,644 | Steinkraus | Nov. 9, 1948 |
| 2,656,297 | Davis et al. | Oct. 20, 1953 |
| 2,676,932 | Deniston | Apr. 27, 1954 |
| 2,692,723 | Elsman | Oct. 26, 1954 |
| 2,793,677 | Armstrong | May 28, 1957 |

FOREIGN PATENTS

| | | |
|---|---|---|
| 757,551 | Great Britain | Sept. 19, 1956 |
| 205,718 | Australia | Dec. 3, 1956 |

OTHER REFERENCES

Publication entitled "The One Pull Opener for Bread Wrappers," by Wilfred Ledoux, 1955, pp. 1 to 5.